Oct. 15, 1957  G. B. HILL ET AL  2,809,574
IMPLEMENT CONTROLLING DEVICE
Original Filed Feb. 9, 1946  5 Sheets-Sheet 1

INVENTORS
GEORGE B. HILL &
MARCUS E. McCLELLAN
BY
ATTORNEYS

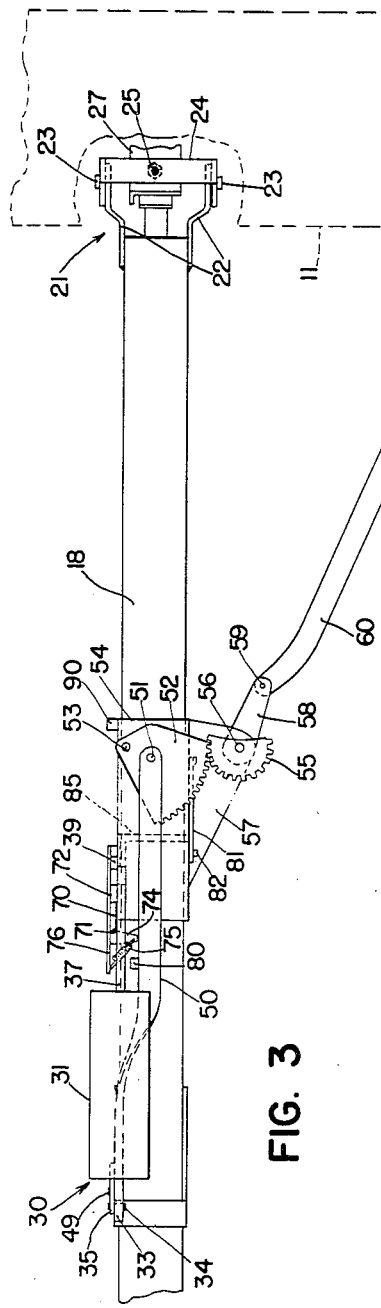
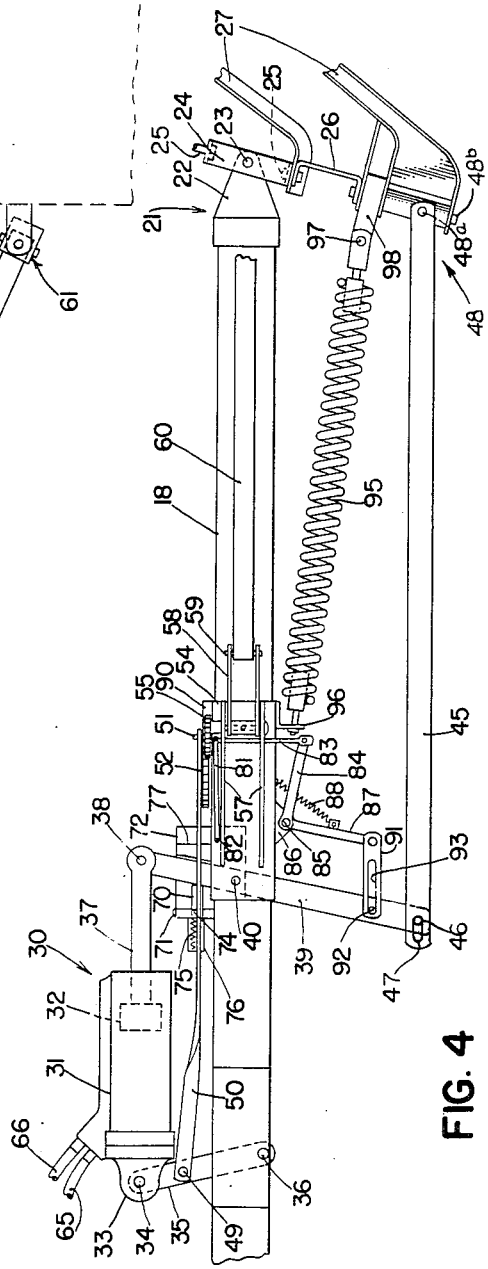

Oct. 15, 1957  G. B. HILL ET AL  2,809,574
IMPLEMENT CONTROLLING DEVICE
Original Filed Feb. 9, 1946  5 Sheets-Sheet 3

INVENTORS
GEORGE B. HILL &
MARCUS E. McCLELLAN
ATTORNEYS

Oct. 15, 1957　　　　G. B. HILL ET AL　　　　2,809,574
IMPLEMENT CONTROLLING DEVICE
Original Filed Feb. 9, 1946　　　　　　　　　　5 Sheets-Sheet 4

INVENTORS
GEORGE B. HILL &
BY MARCUS E. McCLELLAN
ATTORNEYS

Oct. 15, 1957 G. B. HILL ET AL 2,809,574
IMPLEMENT CONTROLLING DEVICE
Original Filed Feb. 9, 1946 5 Sheets-Sheet 5

INVENTORS
GEORGE B. HILL & MARCUS E. McCLELLAN
BY
ATTORNEYS

United States Patent Office 2,809,574
Patented Oct. 15, 1957

2,809,574

IMPLEMENT CONTROLLING DEVICE

George B. Hill, Celina, Ohio, and Marcus E. McClellan, Ottumwa, Iowa, assignors to Deere Manufacturing Co., a corporation of Iowa Continuation of application Serial No. 646,666, February 9, 1946. This application August 13, 1953, Serial No. 373,986

3 Claims. (Cl. 97—46.27)

The present invention relates generally to implement control devices and more particularly to mechanism for adjustably controlling the height of a harvester platform or the like. The application is a continuation of application Serial No. 646,666, filed February 9, 1946, now abandoned.

Certain implements of the type adapted to be drawn behind a tractor in laterally offset position, such as pickup presses, combines, corn harvesters, ensilage harvesters, hay choppers and the like, are usually provided with a draft device in the form of a tongue or frame which extends obliquely forwardly and laterally from the implement and is adapted to be pivotally connected at its forward end to a tractor for the purpose of drawing the implement in laterally offset relation to the tractor during operation in the field. In order to transport the implement from one field to another along narrow roads and through gates, it is usually necessary to adjust the device horizontally relative to the implement in order to position the latter directly behind the tractor, as is well known to those skilled in the art. This is sometimes accomplished by swinging the draft device under the harvester platform when the latter has been raised sufficiently to provide clearance therefor.

Although harvester platforms have been provided with power-operated mechanism for raising and lowering the same for the purpose of making adjustment of the height of the platform during operation in the field, it has always been necessary, as far as we are aware, for the operator to prepare the implement for transport by removing certain securing bolts from the draft device, swinging the latter manually from operating position to transport position, and then replacing the bolts. The reverse operation has been required for converting the implement from transport to operating condition.

One of the principal objects of our invention, therefore, relates to the provision of mechanism receiving power from the tractor engine, for performing this function.

Many tractors are now provided with a hydraulic cylinder connected to the tractor by fluid-pressure-transmitting hoses, but as a rule, only one of such cylinders is provided and this is used for making adjustments of the harvester platform, and it would be inconvenient and expensive to provide a second hydraulic cylinder for infrequently shifting the draft device between transport and working position. Therefore, it is a further object of our invention to provide mechanism by which the single hydraulic cylinder can be made to perform both functions of adjusting the harvester platform and also shifting the draft device relative to the implement frame between transport and working positions.

Still another object pertains to the provision, in this mechanism, for maintaining the draft device in horizontally fixed relation to the implement frame during operation in the field while the harvester platform is raised and lowered by relative movement between the piston and cylinder. Conversely, another object concerns the provision for holding the harvester platform in raised position while the cylinder is used to shift the draft device laterally between working and transport positions.

Still another object relates to the provision of means for automatically locking the draft device against horizontal movement and releasing the platform for vertical adjustment, and vice-versa, responsive to movement of the piston and cylinder assembly under control of the tractor operator, without requiring the operator to leave his position on the tractor.

These and other objects and advantages of our invention will be apparent to those skilled in the art after a consideration of the following description, in which reference is had to the drawings appended hereto, in which Fig. 1 is a top plan view of a pickup baling press embodying the principles of the present invention.

Fig. 3 is a top plan view of the hitch device and control mechanism drawn to an enlarged scale, showing the parts in transport position.

Fig. 4 is a side elevational view of the hitch device and control mechanism shown in Fig. 3.

Figure 1:
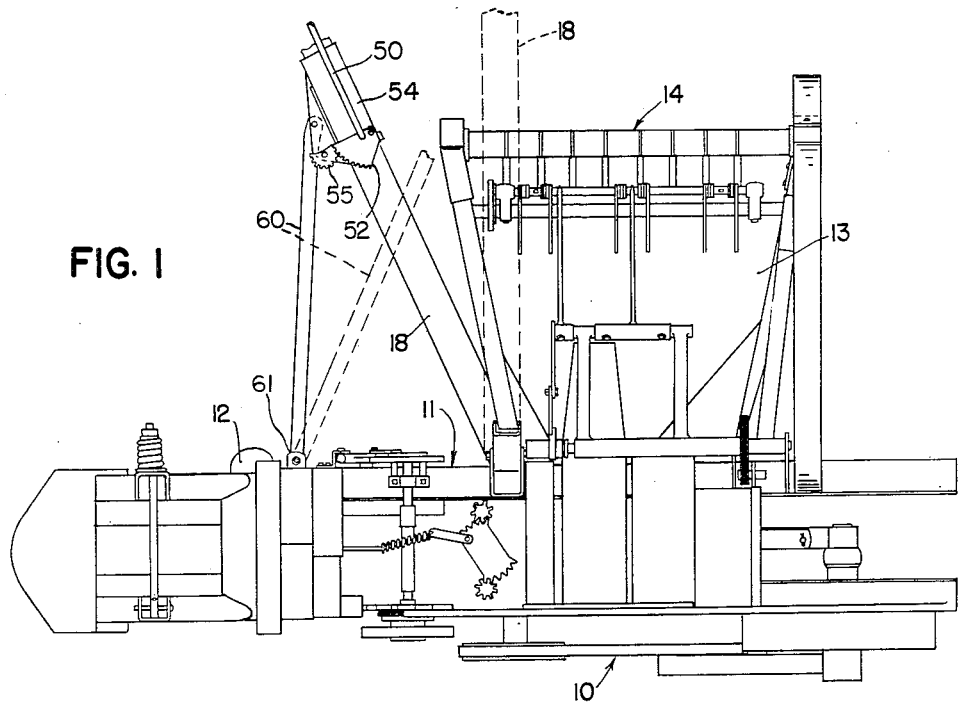
Figure 2:
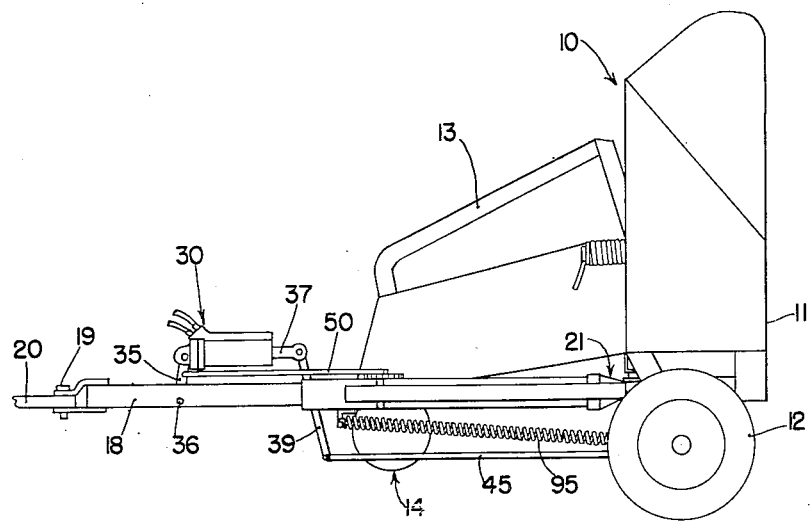
Fig. 2 is a side elevational view of the baling press.

Referring now to the drawings, and more particularly to Figs. 1-7, the implement is indicated in its entirety by reference numeral 10 and comprises a generally transverse body or frame part 11 in the form of a bale case supported on a pair of laterally spaced wheels 12 for travel over the ground. A harvester platform or first adjustable part 13 is constructed rigidly with the body or frame 11 and extends forwardly therefrom to gather crops from the ground and deliver them to the bale case. The forward end of the harvester platform 13 is provided with a pickup device 14 for this purpose, but it is to be understood that our invention is not limited to this particular type of harvester.

Draft is applied to the implement through a hitch part or draft device including a main draft tongue 18 connected by a vertical draft pin 19 to the drawbar 20 of a tractor, on which the forward end of the tongue 18 is thus supported. The rear end of the draft tongue 18 is connected to the implement frame 11 by mounting means that comprises a universal joint 21 having a pair of rearwardly extending ears 22 fixed to the rear end of the draft tongue 18 and connected by transversely alined pivot pins 23 to a metal frame or yoke 24, which is pivotally connected by vertical bolts 25 and a channel beam 26 to the bottom of the bale case and also to a pair of upper and lower supporting legs 27 rigidly mounted on and depending from the transverse frame 11 of the implement. Thus, the draft tongue 18 constitutes a second adjustable part vertically swingable about the axis of the transverse pivot bolts 23 and laterally swingable about the upright or vertical axis of the pivot bolts 25, relative to the implement frame 11.

Hence, the implement is tiltable about the transverse rolling axis of the supporting wheels 12 and pivots about the transverse axis of the pin 23 to raise and lower the harvesting platform 13, while the forward end of the draft tongue 18 remains connected to the tractor drawbar 20. Furthermore, the implement frame 11 and draft tongue 18 are angularly adjustable about the vertical axis of the bolts 25 in order to shift the draft tongue laterally between the working position shown in solid lines in Fig. 1 and the transport position shown in dotted lines.

Control of the draft tongue 18 relative to the implement frame 11 is accomplished by means of a power-actuated, force-exerting means including a hydraulic cylinder and piston assembly or fluid motor 30 comprising first and second force-exerting members or relatively movable parts in the form of a cylinder 31 and a piston 32. The cylinder 31 has a mounting ear 33 at one end thereof pivoted at 34 to the upper end of a hitch-control lever 35 that is swingable fore-and-aft in a generally vertical plane about a supporting pivot 36 on the draft tongue 18. The piston 32 is secured to the inner end of a piston rod 37, the outer end of which is pivotally connected at 38 to the upper end of a frame- or platform-control lever 39, which is pivotally mounted at 40 intermediate its ends on the side of the draft tongue 18. The lower end of the lever 39 provides a lever arm portion that is connected to a rearwardly extending force-transmitting member or link 45 by means of a pivot pin 46 extending through a slot 47 in said link and affording a limited amount of lost motion to provide a floating action of the platform over uneven ground. The rear end of the link 45 is connected by a universal joint 48 to the lower frame leg 27 and includes a horizontal pivot 48a offset beneath the transverse pivot axis 23 and a vertical pivot 48b coaxial with the pivots 25.

The other lever 35 has a lever arm portion pivoted at 49 to the forward end of a force-transmitting member or link 50, which extends rearwardly above the draft tongue 18 and which has its rear end pivotally connected at 51 to a gear segment 52 carried by a vertical shaft 53 on a mounting sleeve 54 surrounding and secured rigidly to the draft tongue 18. The sleeve 54 also acts as a reenforcement for the draft tongue and serves as a mount for the lever 39 and for several other elements which will be described.

The gear segment 52 meshes with a smaller gear segment 55 fixed on a vertical shaft 56, which is journaled in a pair of horizontally disposed, vertically spaced plates 57 rigidly fixed, as by welding, to the side of the sleeve 54. Between the plates 57 and rigidly secured to the shaft 56 is a bifurcated lever arm 58 driven by the gear segment 55 and having a vertical pivot pin 59 connecting the outer end thereof to a link or force-transmitting member 60. The link 60 extends rearwardly and outwardly from the draft tongue 18 and is connected by means of a universal joint 61 to the body or frame 11 of the implement at a point spaced laterally from the vertical pivot at 25 in the universal joint 21.

When the motor 30 extends, it applies a force against the upper ends of the levers 35 and 39, swinging them in relatively opposite directions about their pivot mountings 36 and 40, respectively, and when the motor retracts, the upper ends of the levers 35, 39 are swung toward each other. Thus, when the motor 30 extends, the lever 39 shifts the link 45 forwardly or to the left, as viewed in Fig. 4, relative to the draft tongue 18, thereby shifting the frame legs 27 forwardly relative to the transverse pivot 23 and tilting the body or frame 11 of the implement rearwardly on its wheels 12 to raise the harvester platform 13. Conversely, when the motor 30 retracts, the lever 39 shifts the link 45 rearwardly relative to the draft tongue 18 to lower the harvester platform.

Figure 5:
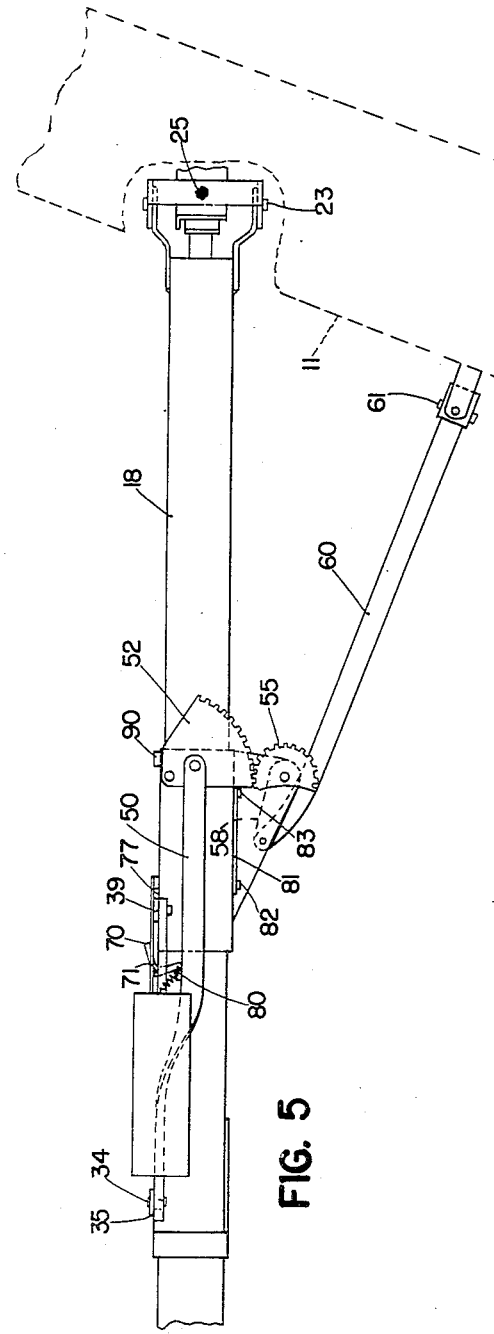
Fig. 5 is a top plan view of the draft device and control mechanism, showing the parts in offset working position, with the platform in raised position.

When the lever 35 moves forwardly about its pivot 36 the link 50 is shifted forwardly and the gear segment 52 is rotated, which in turn rotates the gear segment 55 in a counterclockwise direction, as viewed in Fig. 5, thereby swinging the arm 58 from a forwardly extending position as in Fig. 5 to a rearwardly extending position as in Fig. 3, and shifting the diagonal link 60 rearwardly and outwardly to swing the implement frame 11 relative to the draft tongue 18 about the vertical pivot 25 to the transport position shown in Fig. 3, in which the tongue 18 extends forwardly substantially perpendicular to the frame 11. Conversely, when the motor 30 retracts, its swings the lever 35 rearwardly about its pivot 36, thereby rotating the gear segment 52 in a counterclockwise direction about its pivot 53, turning the gear segment 55 in a clockwise direction and thereby swinging the arm 58 forwardly to pull the diagonal link 60 and the implement frame 11 forwardly relative to the draft tongue 18 into the working position shown in Fig. 5 and by solid lines in Fig. 1.

In order to apply force against the levers 35 and 39 both when extending and when retracting, the piston and cylinder assembly 30 is of the bi-directional or double-action type, being provided with two hoses 65, 66 for conducting fluid under pressure to either end of the cylinder 31, selectively.

Obviously, it is desirable to separate the tilting movement of the implement frame to raise and lower the platform from the horizontal shifting movement of the frame relative to the draft tongue between transport and working positions, for it is necessary, during operation in the field, to raise and lower the harvester platform for adjustment without laterally shifting the implement tongue. And it is necessary to raise the harvester platform above the height of the draft tongue before the latter is shifted laterally under the platform. To accomplish this purpose, the operation of the motor, in each direction of its operation (extending and return), is separated into first and second ranges, each range preferably including part of a stroke of the piston and the part strokes being preferably in sequence in a single full stroke, so that the implement is first tilted to raise (or lower) the platform within a first range of relative movement of the piston 32 in the cylinder 31, while the lateral shifting of the draft tongue 18 relative to the frame 11 is accomplished in a second portion of the range of relative movement of the piston 32 in the cylinder 31.

In the accomplishment of these objects the implement is retained or locked in rearwardly tilted position, with the harvester platform 13 raised above the plane of swinging movement of the draft tongue 18, by means of lock element or latch dog 70 pivoted at 71 on a vertical supporting plate 72, which is rigidly fixed to the side of the mounting sleeve 54. The latch dog 70 is swingable from a locking position, shown in Figs. 3 and 4, in which it engages the front edge of the lever 39, to a disengaged position, shown in Figs. 5, 6 and 7, in which it is swung laterally through a slot 73 in the plate 72 and out of engagement with the lever 39. The dog 70 is provided with a lever arm 74 extending laterally therefrom, and the arm 74 is connected by a spring 75 to a rigid arm 76 fixed to the vertical plate 72. The spring 75 holds the latch dog 70 in engagement with the lever 39 to fix the latter relative to the draft tongue 18 in a position in which the frame 11 is tilted rearwardly sufficiently to hold the harvester platform 13 above the plane of swinging movement of the draft tongue 18. With the lever 39 locked in this position, any relative movement of the piston 32 and cylinder 31 causes the latter to shift fore and aft to swing the lever 35 to shift the link 50 and thereby to move the gear segments 52 and 55 angularly, whereby the arm 58 is rotated to shift the link 60 fore and aft, causing the draft tongue 18 and frame 11 to shift horizontally angularly relative to each other. In this position, the lever 39 is in engagement with a stop block 77 and is held between the latch dog 70 and the stop 77, which prevents vertical swinging movement of the harvester platform.

Figure 6:
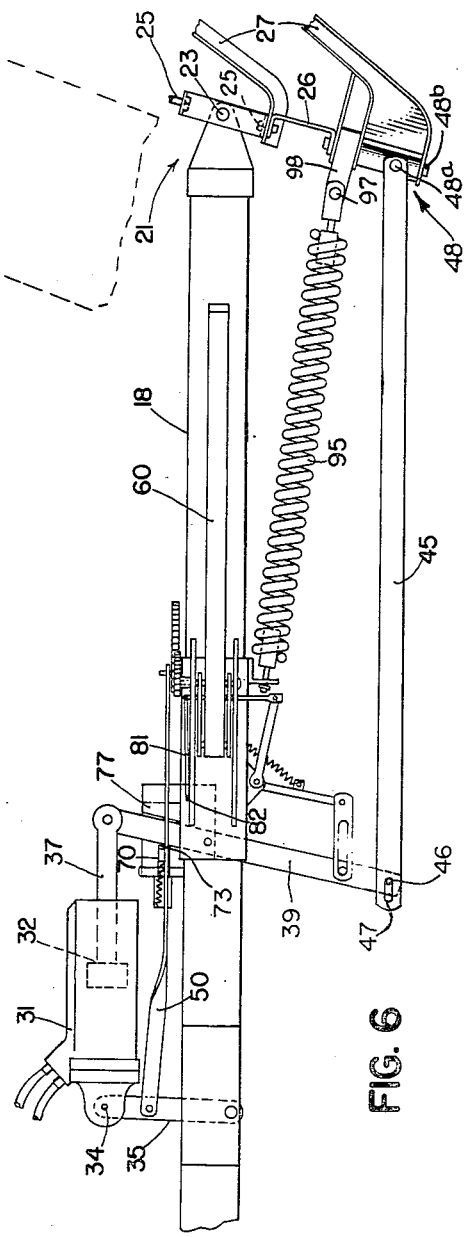
Fig. 6 is a side elevational view of the draft device and control mechanism in the position shown in Fig. 5.

Hence, as the lever 35 is shifted rearwardly by the cylinder 31 from the position shown in Figs. 3 and 4, the draft tongue 18 shifts laterally relative to the frame 11 toward the angled position shown in Figs. 5 and 6.

The latch dog 70 is disengaged from the lever 39 by means of a lug 80 welded to the side of the link 50 in a position to be moved rearwardly with the latter into engagement with the laterally extending crank arm 74 on the dog 70. Thus, as the draft tongue 18 is moved into its working position shown in Fig. 5, the lug 80 engages the arm 74, forcing the latter in a counterclockwise direction, as viewed in Figs. 3 and 5, thereby swinging the dog 70 through the slot 73 and out of engagement with the lever 39, as best shown in Fig. 5. At this time, the gear segment 52 is moved rearwardly to a position in which it is engaged by the rear end of a second lock element or detent arm 81 pivotally mounted at 82 on the side of the mounting sleeve 54. The rear end of the detent arm 81 is pivotally connected to a vertical link 83, the lower end of which is pivoted to an arm 84, which is fixed to a shaft 85 extending transversely beneath the sleeve 54 and journaled in suitable supporting lugs 86 welded to the bottom of the sleeve 54. A downwardly extending crank arm 87, secured rigidly to the transverse shaft 85, is biased by a spring 88 to swing rearwardly, thereby urging the detent arm 81 upwardly against the lower side of the gear segment 52. When the forward edge of the gear segment 52 clears the detent arm 81, the latter shifts upwardly under the pressure of the spring 88 to engage the forward edge of the gear segment 52 and temporarily prevents forward movement thereof, thus locking the draft tongue 18 in its angled working position as shown in Fig. 5. In this position, as shown in Fig. 5, the rear edge of the gear segment 52 engages a fixed stop 90 welded to the side of the mounting sleeve 54, and thus the gear segment 52 is locked between the fixed stop 90 and the detent arm 81. Hence any further retracting movement of the piston 32 relative to the cylinder 31 causes the lever 39 to be shifted in a counterclockwise direction, as viewed in Fig. 6, thus shifting the link 45 rearwardly to lower the harvester platform 13.

The lower end of the crank arm 87 is connected by a link 91 to a pin 92 in the lever 39. The link 91 has a longitudinal slot 93 through which the pin 92 extends and merely slides longitudinally of the slot 93 while the platform is being raised and lowered adjustably during operation in the field. However, when the implement is being conditioned for transport, the cylinder and piston assembly 30 is extended to raise the harvester platform 13, and just before the lever 39 engages the stop 77, the pin 92 reaches the forward end of the slot 93 and pulls the link 91 forwardly, thereby drawing the detent 81 downwardly out of engagement with the gear segment 52, with the result that the disengagement of the detent 81 and the engagement of the dog 70 with the upper portion of the lever 39 is substantially simultaneous.

The detent 81 and gear segment 52, when locked, operate as elements in a first restraining device or control means for negativing lateral swinging of the tongue 18, thus confining the forces exerted by the motor 30 in its first range to the task of tilting the platform. This control means is, however, when combined with 92—93, one of limited effectiveness and endures only until the platform has achieved a predetermined height, at which time 81—52 is released and the forces now become available to swing the tongue laterally. In addition to this, a second restraining device or control means, represented by the upper portion of member 39 and stop 77, becomes effective to negative further tilting of the platform, so that the available forces developed in the second range of the motor 30 are confined to the task of swinging the tongue. The result is a simple sequence in which substantially continuous forces are diverted from one task to another.

The weight of the harvester platform 13 is counterbalanced by means of a spring 95 connected at its forward end to a bracket 96 rigidly attached to the bottom of the mounting sleeve 54 and connected at its rear end by universal joint means comprising a transverse pivot pin 97 in a block 98 pivoted to the transverse frame member 26 on the upright axis 25—25—48b. The tension of the spring tends to swing the lower portions of the legs 27 forwardly about the transverse pivot 23, thereby tilting the upper portion of the frame rearwardly and raising the platform 13, and is preferably provided with sufficient initial tension to raise the platform without the aid of the cylinder.

Figure 7:
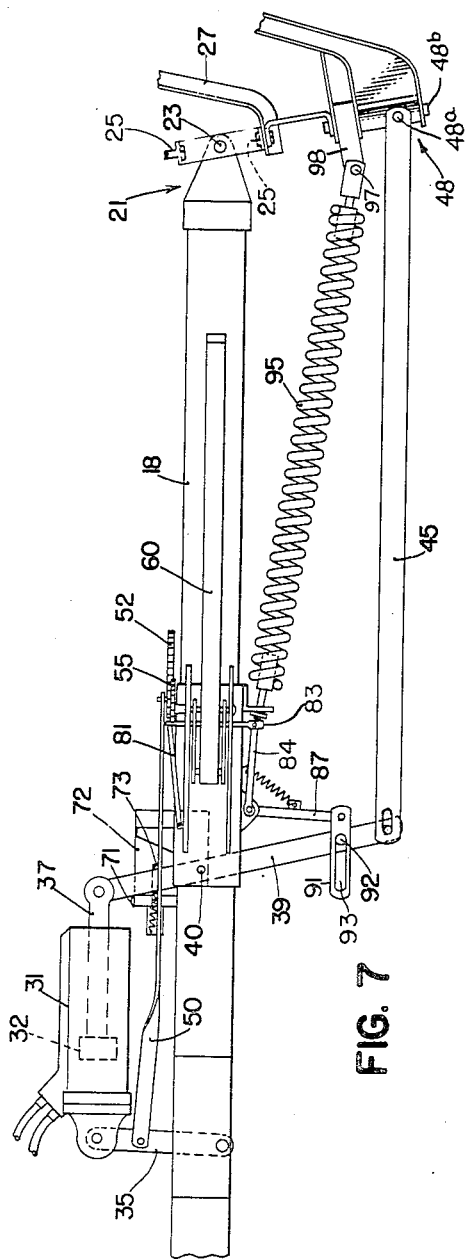
Fig. 7 is a side elevational view of the draft device and control mechanism in a position in which the platform is lowered and the draft device is in working position.

The operation of the implement is summarized as follows: The implement is transported to the field by drawing it directly behind the tractor, in which position the draft tongue 18 extends directly forwardly from the universal joint connection 21, as indicated in dotted lines in Fig. 1. In this position of the implement, the cylinder and piston assembly 30 is in extended position, as indicated in Figs. 3 and 4, with the lever 39 back against the stop 77 and locked in that position by the latch dog 70, thereby holding the harvester platform 13 in raised position above the draft tongue 18, while the draft tongue 18 is held in forwardly extending position by the hydraulic fluid that is locked between the piston 32 and the cylinder 31. When the implement reaches the field of operation, the operator causes the piston and cylinder assembly 30 to retract, but since the arm 39 is locked against angular movement relative to the tongue 18, the cylinder 31 and lever 35 move rearwardly relative to the piston 32, thereby pushing the link 50 and gear segment 52 rearwardly about the axis 53 of the gear segment. This rotates the smaller gear segment 55 in a clockwise direction, as viewed in Fig. 3, thereby swinging the arm 58 forwardly, which pulls through the link 60 and universal joint 61 against the implement frame 11 until the gear segment 52 engages the stop 90. This rear movement of the link 50 shifts the lug 80 into engagement with the arm 74 on the latch dog 70 and disengages the latter from the lever 39 at about the time that the gear segment 52 engages the stop 90. The implement is now in working position, with the draft tongue 18 extending forwardly and laterally, as indicated in solid lines in Fig. 1, but the platform is still raised. As the gear segment 52 moves into engagement with the stop 90, the end of the detent arm 81 is uncovered by the gear segment 52 so that further retracting of the cylinder and piston assembly 30 causes the lower end of the arm 39 to move rearwardly, together with the pin 92 in the slot 93 of the link 91. This releases the bell crank arm 84 to move upwardly under the action of the spring 88, thereby shifting the detent arm 81 into engagement with the forward edge of the gear segment 52 to lock the draft tongue 18 in fixed angular relation to the implement frame 11. This locks the forward lever 35 and cylinder 31 against further movement, after which the piston 32 continues to move forwardly in the cylinder 31 and lowers the harvester platform 13 to the ground, as indicated in Fig. 7, and the selective control means 52—81 is effective to hold the draft tongue against lateral swinging while conditioning the frame and platform for rearward and upward tilting.

Under some operating conditions, it is desirable to hold the harvester platform 13 at various adjusted heights above the ground. This is accomplished by extending or retracting the cylinder and piston assembly 30 to obtain any desired ground clearance. Inasmuch as the cylinder 31 and lever 35 are locked against fore-and-aft movement by means of the detent 81, any adjustment of the piston 32 in the cylinder 31 causes a tilting movement of the implement frame on its supporting wheels and about the axis of the transverse bolts 23 in the universal joint 21.

When the implement is to be removed from the field of operation, the operator causes hydraulic fluid to be forced through the hose 65 into the forward end of the cylinder 31, thereby forcing the piston 32 rearwardly and the lower end of the arm 39 forwardly to transmit force through the link 45 for raising the platform. The lever 39 moves until the pin 92 engages the forward end of the slot 93 to swing the arm 87 forwardly and thus disengage the detent 81 from the gear segment 52. At this point the lever 39 also engages the stop 77, with the result that further extending action of the piston and cylinder assembly 30 causes the cylinder 31 to move forwardly, to disengage the lug 80 from the arm 74, thereby permitting the spring 75 to turn the latch dog 70 into engagement with the front of the lever 39. The implement is now locked in rearwardly tilted position, with the harvester platform raised to its full extent, after which further extending movement of the assembly 30 forces the cylinder 31 forwardly, which pulls through the link 50 against the gear segment 52, thereby rotating the smaller gear segment 55 in a counterclockwise direction to move the latter from the working position shown in Fig. 5 back to the transport position shown in Fig. 3, which acts through the link 60 to return the frame 11 and draft tongue 18 to the transport position.

Figure 8:
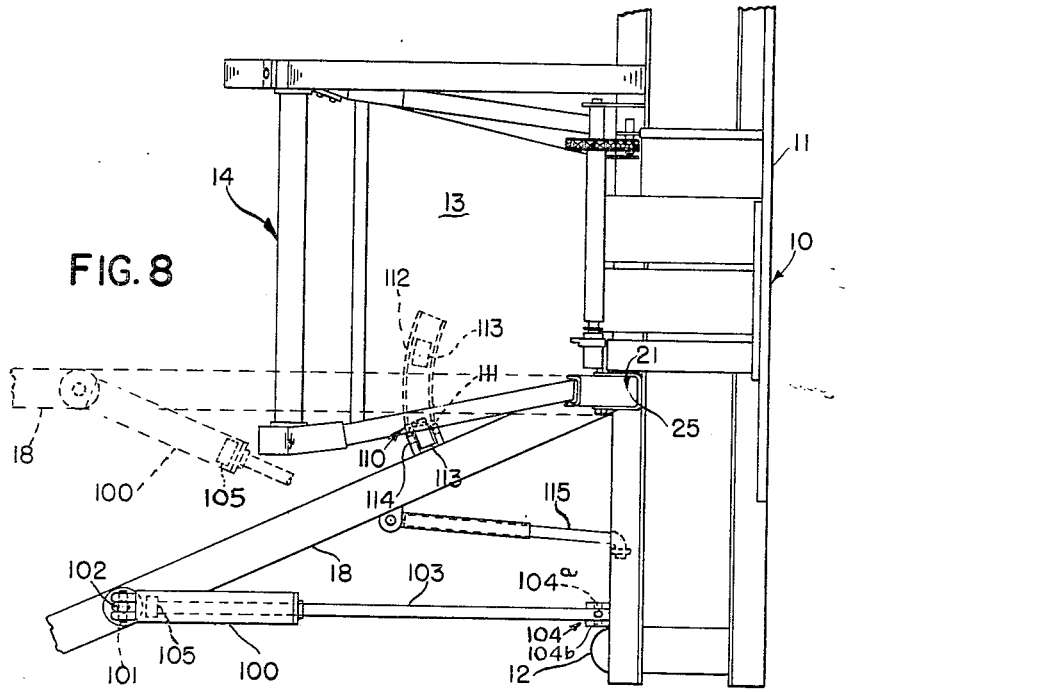
Fig. 8 is a top plan view of a pickup baling press embodying a modified form of our invention.
Figure 9:
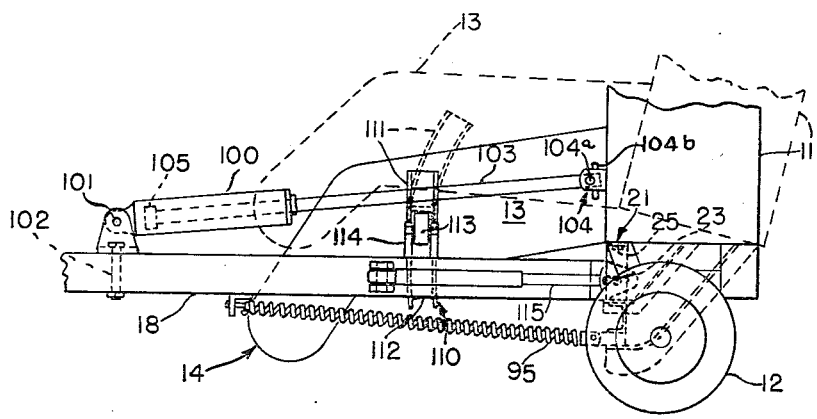
Fig. 9 is a side elevational view of the baling press shown in Fig. 8, in transport position.

Referring now to the embodiment shown in Figs. 8 and 9, the baling press 10 is similar to that of the foregoing description and has similar parts indicated by like reference numerals.

The force-exerting means comprises a fluid motor having a hydraulic cylinder 100 pivotally mounted on a transverse pivot 101 on a vertical spindle 102 on the draft tongue 18 and a piston 105 slidable therein. A piston rod 103, connected to the piston 105, serves as a force-exerting member and extends out of the rear end of the cylinder and is universally connected at 104 to the bale case 11 on a transversely extending axis 104a spaced above the axis of the horizontal pivot bolts 23 and a vertical axis 104b spaced laterally from the vertical pivot axis 25, with the result that when the piston 105 moves rearwardly in the cylinder, it exerts a force against the body having components tending to tilt the body rearwardly relative to the tongue 18 about the transverse pivot axis 23 to raise the rigid platform 13 and also to swing the tongue 18 laterally inwardly about the vertical pivot axis 25.

The platform 13 is provided with control means in the form of a track 110 of channel section rigidly fixed thereto and having a generally vertical portion 111 extending downwardly at the side of the platform adjacent the tongue 18. The channel member turns laterally beneath the platform to provide a generally horizontal track portion 112 curved in an arc about the vertical pivot axis 25. The vertical portion 111 is curved in an arc about the transverse pivot axis 23.

A track follower in the form of a roller 113 is journaled on a bracket 114 mounted on the draft tongue 18 in a position in which it runs in the channel track member 110. When the piston 105 moves rearwardly in the cylinder 100, the implement is tilted rearwardly on its wheels 12, raising the platform 13, but the roller 113 bearing against the vertical track portion 111 prevents lateral swinging movement of the draft tongue 18 about its vertical pivot axis 25 until the platform 13 is raised to the position indicated in dotted lines in Fig. 9, after which further extension of the piston rod pushes the draft tongue 18 laterally under the platform 13, the roller 113 then running in the horizontal portion 112 of the track to prevent the platform 13 from lowering. The implement is then in transport position, as indicated in dotted lines in Figs. 8 and 9. Thus, the vertical part or element 111 of the control track is part of a control means or device of limited effectiveness—measured by its length—to confine forces exerted by the motor 100—105 to the task of tilting the platform, since forces tending to swing the tongue are negatived until the roller element 113 reaches the junction of the track or control elements 111 and 112. And the track part 112 combines with the roller element 113 to provide a second control means or device of limited effectiveness, because, when the roller 113 runs under the track part 112, vertical movement of the platform in at least one direction is prevented; and forces exerted by the motor 100—105 are confined to the task of swinging the tongue. Because the resistance of the tilted platform to further tilting upwardly is greater than the resistance of the tongue to lateral swinging, no stop means need be provided to limit upward tilting of the platform, but such stop means could be supplied in any suitable manner if desired.

The implement can be returned to normal operating position by causing the piston 105 to move forwardly in the cylinder 100, thereby swinging the draft tongue 18 laterally outwardly while the roller 113 prevents the platform from dropping until the roller begins to travel upwardly along the vertical portion 111 of the track 110. A collapsible brace 115 in the form of a pair of telescoping members connects the draft tongue 18 with the bale case 11. When the tongue 18 swings outwardly, its movement is stopped in normal working position by the bottoming of the bracing members 115, one within the other, whereby further forward movement of the piston 105 in the cylinder causes the body to tilt forwardly, lowering the platform 13. The roller at this time rolls upwardly along the vertical track section 111.

We claim:

1. In an implement having a frame part and a hitch part interconnected for relative swinging about a vertical axis and also for relative tilting about a horizontal axis so that the frame part may be tilted upwardly and the hitch part swung laterally, the improvement comprising: a hitch control member movable on one part and connected to the other part for swinging the parts relatively; a frame control member movable on one part and connected to the other part for tilting the parts; force-exerting means having a pair of force-exerting members connected respectively to the hitch control member and the frame control member and arranged for relative movement through first and second ranges to act on one control member and to react on the other control member; selectively releasable and engageable means engaged between one part and the hitch control member and released from one part and the frame control member for holding the hitch control member so that first-range operation of the force-exerting means effects only relative tilting of the parts; and means interconnecting the force-exerting means and the selectively releasable and engageable means and operative upon change from first- to second-range operation of the force-exerting means to release the hitch control part and to hold the frame control part so that second-range operation of the force-exerting means effects only relative swinging of the parts.

2. In an implement having a frame part and a hitch part interconnected for both relative lateral swinging about a vertical axis and relative tilting about a horizontal axis so that the frame part may be tilted upwardly and the hitch part swung laterally, the improvement comprising: force-exerting means connected to one of the parts and having members movable in a predetermined range relative to each other selectively back and forth in opposite directions along a defined path; means connected to one of the members and one of the parts for transmitting force from the force-exerting means in one direction to cause relative swinging of the parts; second means connected to one of the force-exerting members and one of the parts for transmitting force from the force-exerting means in another direction to cause relative tilting of the parts; means associated with the first force-transmitting means for disabling said first force-transmitting means during relative movement of the force-exerting members in either direction through an initial part of the aforesaid range so that the parts are relatively tilted only; and means associated with the second force-transmitting means for disabling said second force-transmitting means and restoring the first force-transmitting means during relative movement of the force-exerting members in either direction in a subsequent part of said range so that the parts are relatively swung only.

3. In an implement having a frame part and a forwardly extending hitch part connected to the frame part for relative swinging of the parts about a vertical axis and also for relative tilting of the parts about a transverse horizontal axis so that the frame part may be tilted upwardly and the hitch part swung laterally, the improvement comprising: first and second levers pivoted on the hitch part on spaced apart axes; a force-transmitting connection between the first lever and a portion of the frame part spaced vertically from the tilting axis so that rocking of the first lever is effective to tilt the frame part relative to the hitch part; a second force-transmitting connection, between the second lever and a portion of the frame part spaced laterally from the swinging axis so that rocking of the second lever is effective to swing the frame part relative to the hitch part; force-exerting means connected between the levers and operative through a predetermined range to act on one lever and react against the other for rocking the levers; a first releasable lock element between the hitch part and the first lever for immobilizing the first lever; a second releasable lock element between the hitch part and the second lever for immobilizing the second lever; and means operative in response to operation of the force-exerting means for initially locking the first lock element and releasing the second lock element and for sequentially releasing the first locking element and locking the second lock element so that the first and second levers are alternately immobilized and released to produce first relative swinging and then relative tilting of the frame parts.

No references cited.